Feb. 9, 1926.
H. B. MAGLATHLIN
BERRY HARVESTER
Filed Oct. 21, 1924
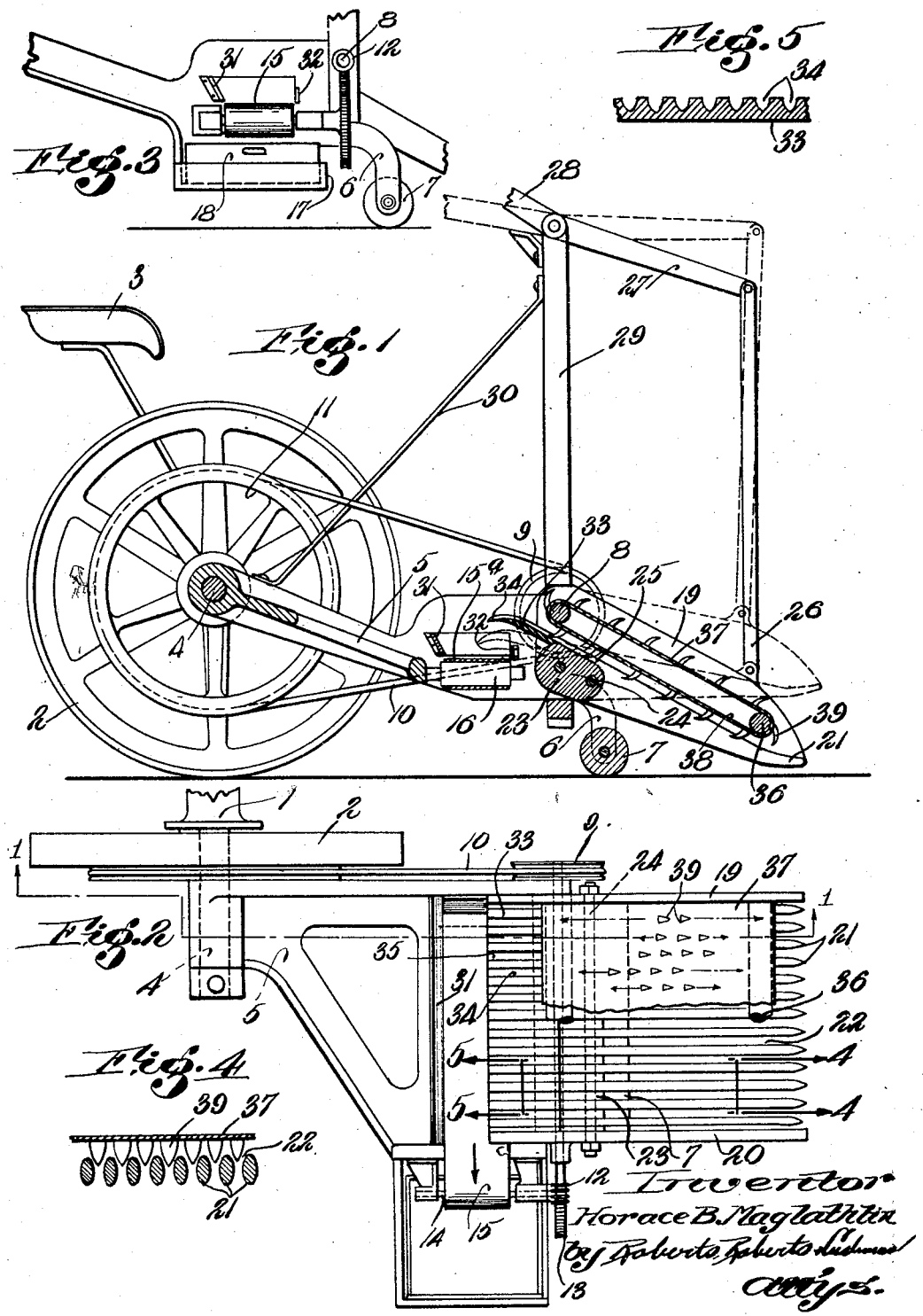

Patented Feb. 9, 1926.

1,572,025

UNITED STATES PATENT OFFICE.

HORACE B. MAGLATHLIN, OF KINGSTON, MASSACHUSETTS, ASSIGNOR OF ONE-HALF TO FRANKLIN E. SMITH, OF NEWTON, MASSACHUSETTS.

BERRY HARVESTER.

Application filed October 21, 1924. Serial No. 744,896.

*To all whom it may concern:*

Be it known that I, HORACE B. MAGLATHLIN, a citizen of the United States of America, and resident of Kingston, in the county of Plymouth and State of Massachusetts, have invented new and useful Improvements in Berry Harvesters, of which the following is a specification.

This invention pertains to cranberry harvesting machines and relates more particularly to that type of machine disclosed in the patent to Horace B. Maglathlin No. 1,233,089, dated July 10, 1917.

In machines of this type the berries are stripped from the vines by means of a toothed scoop and a cooperating rotary brush. The scoops usually comprise a series of tapering, flattened wooden fingers held in parallel spaced relation by means of spacer elements interposed between the fingers adjacent to their wider ends, the fingers and spacer blocks being united by one or more tie rods extending through the entire series.

Ordinarily the spacer elements are of substantially the same vertical depth as the teeth between which they are interposed so that as the berries move upwardly along the channels between the adjacent teeth of the scoop they are obliged to rise abruptly in passing the obstruction produced by the spacer elements which tends to injure the berries to a certain extent as well as to interfere with their free and continuous discharge from the delivery end of the scoop.

While the patented machine is in general highly satisfactory for the intended purpose the present invention has for its object the improvement of such machine, and in particular to provide a scoop of improved construction having uninterrupted guide channels for the berries along which they may move without obstruction or interference until discharged from the upper or rear end of the scoop; to provide means combined with the scoop proper and forming in effect a continuation thereof, for delivering the berries onto a suitable conveyor; to provide an improved form of stripper for cooperation with the scoop which not only detaches the berries from the vine but also moves them in a positive manner substantially the entire length of the guide channels so that they are discharged in a uniform manner and do not pile up and interfere with the stripping operation; and to provide for the delivery of berries discharged from the scoop into a removable receptacle such for example as a shipping box.

Referring to the drawings:—

Fig. 1 is a fragmentary side elevation partly in vertical section along line 1—1 of Fig. 2 showing the improved picking mechanism;

Fig. 2 is a fragmentary plan view, partly broken away, of the devices shown in Fig. 1;

Fig. 3 is a fragmentary side elevation showing parts not illustrated in Fig. 1;

Fig. 4 is a fragmentary vertical section to larger scale on the line 4—4 of Fig. 2; and Fig. 5 is a similar section on the line 5—5 of Fig. 2.

The improved picking mechanism is here shown as carried by a horse-drawn vehicle, although it is evident that it may be mounted upon a motor-propelled vehicle of any desired type. Only a portion of the supporting vehicle or carriage is herein illustrated. This carriage comprises the axle 1 mounted upon wheels of which one only is indicated by the numeral 2. This carriage may be provided with a seat 3 for the driver and supports the picking mechanism upon a lateral extension 4 on the axle.

The frame of the picking mechanism is indicated at 5. This frame is hung at its rear end upon the extension 4, and is provided with brackets 6 at its forward end providing journals for a supporting roller 7. At a point substantially above the roller 7, the frame is furnished with journals for a transverse shaft 8 having a pulley 9 secured to one end thereof. This pulley is driven by means of a belt 10 which engages a drive pulley 11 secured to the wheel 2 of the carriage.

The shaft is furnished with a worm 12 at its opposite end which meshes with a worm wheel 13 carried by a shaft 14 extending substantially at right angles to the shaft 8. This shaft 14 is furnished with a roller which constitutes the driving means for an endless conveyor belt 15 whose opposite end embraces a supporting roller 16 mounted in suitable bearings in the frame.

A shelf 17 is secured to the frame 5 at a point below the discharge end of the conveyor belt 15 and is adapted to hold a suitable receptacle, such for example as the box 18 which may be of the type commonly employed for shipping cranberries.

The scoop structure is pivotally supported upon the shaft 8. This scoop structure comprises spaced side members 19 and 20 and a series of elongated fingers 21 preferably made of wood and which taper substantially to a point at their forward ends. These scoop fingers are preferably of greater depth than width and as indicated in Fig. 4 may be of greatest thickness at a point midway their depth. These fingers are spaced apart to permit the cranberry vines to enter between them but at their narrowest point the openings between the fingers are of such width as to prevent cranberries from dropping through them. The upper parts of the openings or spaces between the adjacent teeth thus constitute elongated channels 22 in which the berries are received and along which they are moved by the mechanism hereinafter described.

For holding the fingers 21 in properly spaced relation, spacer blocks 23 are interposed between adjacent fingers at their rear or tapered ends. These spacer blocks together with the fingers 21 are held securely in proper relative position by means of one or more tie rods 24 extending through the entire series of spacers and fingers and through the side members 19 and 20 of the scoop.

The spacer blocks 23 are of less vertical depth than the fingers 21 between which they are placed so that berry-guiding channels 25 in continuation of the channels 22 are formed above the blocks 23.

The scoop structure normally inclines downwardly from its pivotal point on the shaft 8 but may be adjusted to various inclinations by means of a link or links 26 secured to the forward end of the scoop and connected at its upper end to a lever 27 having an arm 28 which constitutes a handle by means of which it may be rocked. This handle may be provided with any suitable locking means (not shown) for retaining it in adjusted position. The lever 27 is fulcrumed upon a post 29 secured to the frame 5 and braced by a rod 30.

The upper run 15ª of the belt conveyor 15 is provided with lateral guards 31 and 32 respectively forming a trough for the reception of the berries. This trough is spaced somewhat from the upper end of the scoop to facilitate adjustment of the latter, and it is thus necessary to provide some means for guiding berries with certainty from the upper end of the scoop proper to the conveyor.

For this purpose a plate 33, of wood or other suitable material, is secured between the side members 19 and 20 of the scoop, extending beyond the upper end of the fingers 21 substantially in the plane of the upper edges of the latter. This plate is furnished with a series of parallel slots 34 which form continuations of the channels 25 and 22 between the fingers, the plate terminating at 34 above the belt 15 and between the guards 31 and 32.

The stripper device comprises a shaft 36 journalled between the side members 19 and 20 of the scoop near the lower end of the latter and an endless belt or flexible support 37 which passes over the roller 36 and over the axle 6, receiving its motion from the latter. This belt or flexible support is furnished with series of claws or teeth 39, one series of such claws or teeth being arranged substantially in the vertical plane of each of the guide channels 22. The lower run 38 of the belt lies substantially parallel to the plane of the upper edges of the fingers 21 and at such a distance therefrom that the claws or teeth 29 project downwardly into the channels 32. The claws or teeth are preferably curved and point in the direction of the movement of the belt.

In operation, the machine is drawn forwardly over the cranberry bog with the scoop lowered to such a position that the vines are caught between the fingers 21 and lifted to permit the claws or teeth 37 to engage the berries and strip them from the vines. As the claws or teeth travel continuously up along the scoop, the berries, as stripped off, are compelled positively to move along the guide channels 22, along the channels 25 above the spacer blocks 23, and thence into the grooves 34 from which they are discharged onto the belt conveyor 15 and are thereby delivered into the box 18.

In the construction illustrated the berry-guiding channels are uninterrupted and unobstructed from end to end so that the berries move freely along them and as the stripper device continues to push the berries along the entire length of the scoop there is no danger that they will pile up and be damaged or spilled.

While I have described my improved machine in more or less detail to comply with the requirements of the statute, it is nevertheless desired that this detailed description be considered merely as illustrative and not as limiting, and it is to be understood that changes and modifications may be made by those skilled in this art without departing from the invention as defined in the following claims.

I claim:

1. A berry harvesting machine comprising a scoop having a series of parallel fingers, and means spacing said fingers to provide berry guiding channels between them, the channels extending uninterruptedly from one end of the scoop structure to the other.

2. A berry harvesting machine having a scoop comprising a series of parallel fingers, and spacer elements interposed between adjacent fingers near one end of the latter to space the fingers whereby to provide berry guiding channels between them, said channels extending uninterruptedly past the position of the spacer elements.

3. A berry harvesting machine having a scoop comprising a series of parallel fingers of greater vertical depth at one end than at the other, and spacers between the adjacent fingers at their deeper ends, the upper edges of the spacers being disposed below the upper edges of the fingers to provide berry guiding channels above the spacers.

4. A berry harvesting machine comprising a scoop having a series of tapering fingers, spacers interposed between adjacent fingers of the series to provide berry guiding channels between them, and means uniting the fingers and spacers, the upper edges of the spacers being disposed below the upper edges of the fingers to avoid obstruction of the berry guiding channels.

5. A berry harvesting machine having a scoop comprising a series of substantially parallel spaced fingers having uninterrupted berry guiding channels between them, and means cooperating with each of said channels for positively propelling berries along the channels substantially from one end to the other of the latter.

6. A berry harvesting machine having a scoop supported adjacent to one end and normally inclining downwardly toward its other end, a conveyor extending transversely to the width of the scoop adjacent to its upper end, means for propelling berries upwardly along the scoop, and means for conducting the berries from the upper end of the scoop onto said conveyor.

7. A berry harvesting machine having a scoop comprising a series of parallel fingers spaced to provide berry guiding channels and a grooved member arranged at one end of the scoop to provide extensions of the channels beyond the end of the scoop proper.

8. A berry harvesting machine having a scoop provided with a series of parallel berry guiding channels, a member connected to one end of the scoop having grooves forming continuations of said channels, a conveyor device arranged to receive berries discharged from the ends of said grooves, and means for propelling berries along said channels.

9. A berry harvesting machine having a scoop comprising a series of berry guiding channels, a plate forming an extension of the scoop at one end of the latter, said plate having grooves constituting continuations of the respective channels, and a belt conveyor arranged to receive berries discharged from the ends of said grooves.

10. A berry harvesting machine having a downwardly inclined scoop comprising a series of parallel berry guiding channels, a belt conveyor arranged adjacent to the upper end of the scoop, a plate extending from the upper end of the scoop to a point above the conveyor, said plate having grooves forming continuations of the berry guiding channels, and berry engaging elements moving along the channels to propel berries toward the upper end of the scoop.

11. A berry harvesting machine having a downwardly inclined scoop pivotally supported adjacent to its upper end, said scoop having parallel longitudinally extending berry guiding channels, a conveyor extending transversely of the scoop adjacent to its upper end, a member extending from the upper edge of the scoop to a point above the conveyor, said member having parallel grooves constituting continuations of the guide channels, means for supporting a removable receptacle at the end of the conveyor, and means for moving berries upwardly along the channels to be discharged from the ends of the grooves onto the conveyor.

12. A berry harvesting machine having a downwardly inclined scoop comprising a series of fingers spaced to provide berry guiding channels, means for propelling berries toward the upper ends of said channels, a conveyor extending transversely of the width of the scoop for receiving berries discharged from all of the channels, and means for supporting a removable receptacle at the delivery end of the conveyor.

13. A berry harvesting machine having a downwardly inclined scoop pivotally supported at its upper end, means for adjusting the inclination of the scoop, the scoop comprising a series of parallel berry guiding channels, a belt conveyor arranged adjacent to the upper end of the scoop, means for driving the belt conveyor, a support for a berry box adjacent to the delivery end of the conveyor, and means for propelling berries from the guide channels to the conveyor.

Signed by me at Boston, Massachusetts, this 10th day of October 1924.

HORACE B. MAGLATHLIN.